US009274804B2

(12) United States Patent
Gillespie et al.

(10) Patent No.: US 9,274,804 B2
(45) Date of Patent: Mar. 1, 2016

(54) OVERLAPPED BOOT TASK FETCHES AND BOOT TASK EXECUTION TO REDUCE BOOT TIME IN AN ELECTRICAL DEVICE

(75) Inventors: Kurt D. Gillespie, Houston, TX (US); James F. Murray, Tomball, TX (US); Jayne E. Scott, Sugar Land, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 13/145,734

(22) PCT Filed: Feb. 3, 2009

(86) PCT No.: PCT/US2009/032972
§ 371 (c)(1),
(2), (4) Date: Jul. 21, 2011

(87) PCT Pub. No.: WO2010/090636
PCT Pub. Date: Aug. 12, 2010

(65) Prior Publication Data
US 2011/0283098 A1   Nov. 17, 2011

(51) Int. Cl.
*G06F 9/00*   (2006.01)
*G06F 15/177*   (2006.01)
*G06F 9/44*   (2006.01)

(52) U.S. Cl.
CPC ................... *G06F 9/4401* (2013.01)

(58) Field of Classification Search
CPC ........................................................ G06F 9/44
USPC ......................................................... 713/1, 2
See application file for complete search history.

(56) References Cited

U.S. PATENT DOCUMENTS

| | | | | |
|---|---|---|---|---|
| 4,210,960 A * | 7/1980 | Borgerson et al. | ............ | 712/230 |
| 5,113,522 A * | 5/1992 | Dinwiddie, Jr. | ..... | G06F 11/1641 713/2 |
| 5,396,601 A * | 3/1995 | Tokushige et al. | ............ | 710/313 |
| 5,701,502 A * | 12/1997 | Baker | ................... | G06F 13/368 709/201 |
| 6,266,761 B1 * | 7/2001 | Carlson et al. | ................... | 712/23 |
| 6,374,286 B1 * | 4/2002 | Gee et al. | ...................... | 718/108 |
| 6,658,621 B1 * | 12/2003 | Jamil et al. | ..................... | 714/805 |
| 6,954,848 B2 * | 10/2005 | Rakvic et al. | ................. | 712/214 |
| 7,310,724 B2 | 12/2007 | Chen et al. | | |
| 2004/0177211 A1 * | 9/2004 | Boles et al. | ........................ | 711/5 |
| 2004/0215951 A1 * | 10/2004 | Chen et al. | ........................ | 713/1 |
| 2004/0268108 A1 | 12/2004 | Chen et al. | | |
| 2005/0086667 A1 * | 4/2005 | Jin et al. | ........................ | 719/327 |
| 2005/0210222 A1 | 9/2005 | Liu et al. | | |

(Continued)

OTHER PUBLICATIONS

International Searching Authority, International Search Report and Written Opinion, Appln No. PCT/US2009/032972, date of mailing Oct. 30, 2009, 12 p.

(Continued)

*Primary Examiner* — Mohammed Rehman
(74) *Attorney, Agent, or Firm* — Conley Rose

(57) ABSTRACT

In accordance with at least some embodiments, a system includes a first processor and a second processor. The system also includes a boot task storage medium that can only be accessed by one processor at a time. A boot process of the system has a first stage and a second stage. During the first stage, the first processor fetches and executes boot tasks without assistance from the second processor. During the second stage, boot task execution performed by first processor overlaps with at least one boot task fetch performed by the second processor.

15 Claims, 4 Drawing Sheets

(56) References Cited

U.S. PATENT DOCUMENTS

| | | | |
|---|---|---|---|
| 2006/0129795 | A1 | 6/2006 | Bulusu et al. |
| 2007/0033389 | A1* | 2/2007 | Shamia et al. .................... 713/2 |
| 2008/0162878 | A1 | 7/2008 | Zimmer et al. |
| 2009/0228693 | A1* | 9/2009 | Koenck et al. ................ 712/248 |
| 2010/0235618 | A1* | 9/2010 | Erforth et al. .................... 713/2 |

OTHER PUBLICATIONS

Examination Report Under Section 18(3) received in GB Application No. 1112702.4, mailed on Feb. 6, 2014, 3 pgs.

Examination Report Under Section 18(3) recieved in GB Application No. 1112702.4, mailed on Nov. 1, 2013, 4 pgs.

\* cited by examiner

OVERLAPPED BOOT TASK FETCHES AND BOOT TASK EXECUTION TO REDUCE BOOT TIME IN AN ELECTRICAL DEVICE

BACKGROUND

Many electronic devices (e.g., computers) have a boot process that loads the main operation system. Methods and systems that reduce the time needed to complete a boot process are desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to improving the efficiency of a boot (or boot-up) process. As used herein, a boot process refers to various steps that are implemented upon powering an electronic device (i.e., switching the device from an "off" state to an "on" state) and includes loading the device's main operation system (OS). In accordance with some embodiments, fetch and execution tasks during the boot process of an electronic device are segmented and distributed among multiple processors or processor cores. By overlapping boot task fetches performed by a second processor with boot task execution performed by a first processor, the total boot time is reduced compared to fetching and executing boot tasks with a single processor. The boot tasks may be, for example, instructions, drivers, or other tasks. As used herein, a "driver" refers to a set of instructions that control how a host device communicates with an internal or external hardware component.

Figure 1:
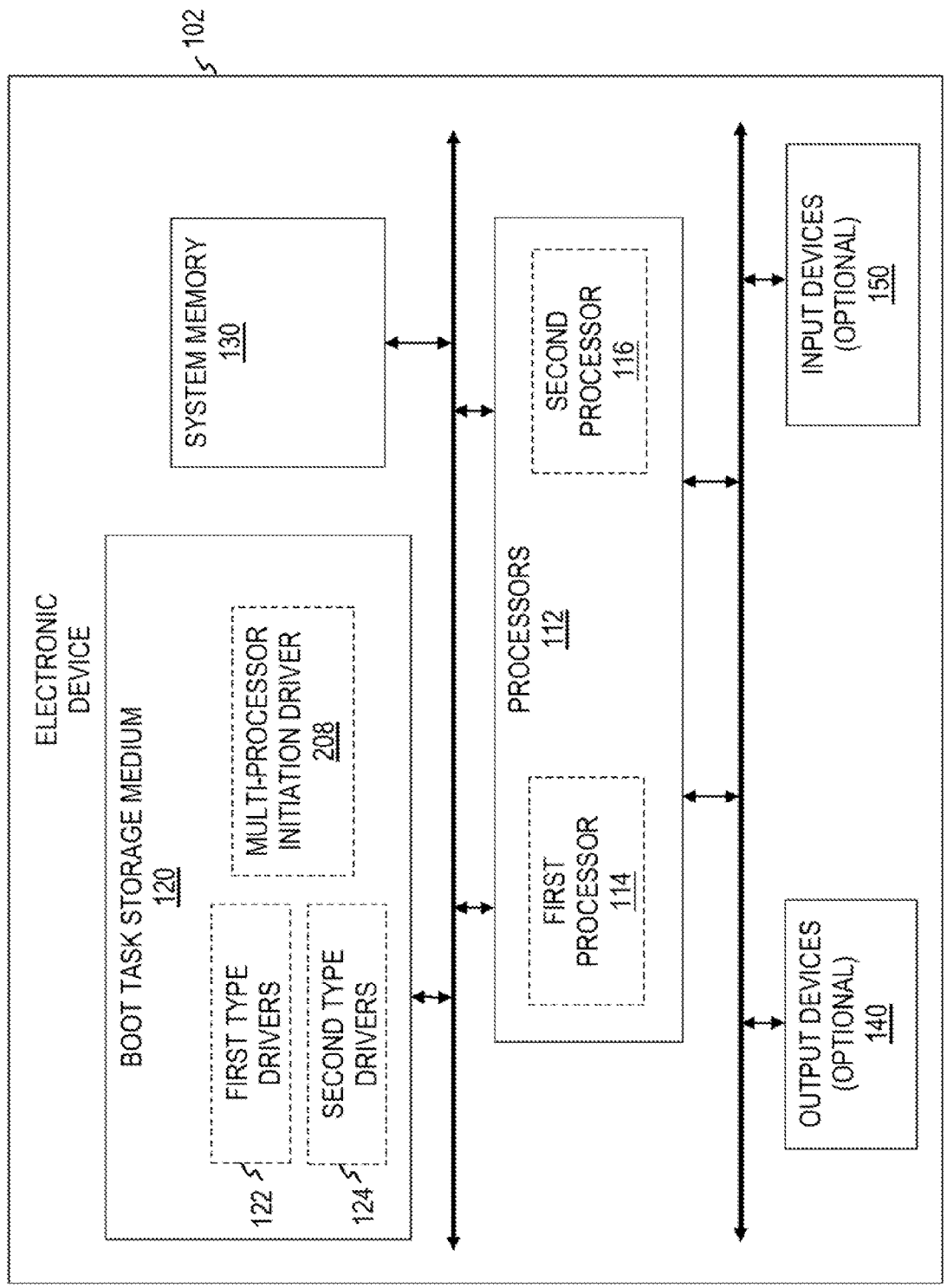
FIG. 1 shows an electronic device in accordance with an embodiment of the disclosure.

FIG. 1 shows an electronic device 102 in accordance with an embodiment of the disclosure. The electronic device 102 may correspond to a desktop computer, a laptop computer, a server, a smart phone, a cell phone, a personal digital assistant (PDA), or other electronic devices with a boot process. As shown, the electronic device 102 comprises a plurality of processors 112, including a first processor 114 and a second processor 116. The processors 112 correspond to at least one of a variety of semiconductor devices such as microprocessors, microcontrollers, central processor units (CPUs), main processing units (MPUs), digital signal processors (DSPs), advanced reduced instruction set computing (RISC) machines, ARM processors, application specific integrated circuits (ASICs), field programmable gate arrays (FPGAs) or other processing devices. In accordance with some embodiments, the processors 112 are separate processor chips. Alternatively, the processors 112 are separate processor cores on a single chip. Alternatively, the processors 112 are virtualized by a single processor.

During runtime (i.e., once the main OS has been loaded), the processors 112 perform a set of predetermined operations based on data/instructions stored in or accessible to the processors 112. In at least some embodiments, the processors 112 couple to a system memory 130 that stores data/instructions for execution by the processors 112.

During a boot process, at least one of the processors 112 fetches drivers (or other tasks) from a boot task storage medium 120, which represents a Basic Input/Output System (BIOS) memory (e.g., an Extensible Firmware Interface (EFI) BIOS memory) or another memory available during the boot process. Fetched drivers (or other tasks) are stored in the system memory 130 for execution by one of the processors 112. In at least some embodiments, the boot task storage medium 120 corresponds to a Read-Only Memory (ROM) or another non-volatile memory, and the system memory 130 corresponds to a random access memory (RAM).

Although not necessarily required, the system memory 130 is typically much faster (e.g., referring at least to the read speed) than the boot task storage medium 120. To advantageously enable overlapping of driver fetches and driver execution, the driver fetch process is segmented. As an example, if the boot task storage medium 120 stores ten drivers, the drivers could be fetched one at a time. Alternatively, sets of two or more drivers can be fetched in turn. In general, the amount of drivers transferred with each fetch routine may vary. However, multiple driver fetch routines are preferred to increase the overlapping of driver fetches (from the boot task storage medium 120) and driver execution (from the system memory 130).

In accordance with various embodiments, only one processor at a time is able to fetch drivers from, or otherwise access, the boot task storage medium 120. Thus, if multiple processors are configured to fetch drivers from the boot task storage medium 120, these processors take turns accessing the boot task storage medium 120. In some embodiments, the fetching processors may have different priority levels. In such cases, the fetch routines of a lower priority processor can be interrupted by a higher priority processor. However, in such embodiments, the fetch routines of a higher priority processor cannot be interrupted by a lower priority processor.

In accordance with embodiments, driver fetch routines overlap driver execution routines to reduce the total boot-up time. For example, in the embodiment of FIG. 1, a multi-processor initiation driver 208 is fetched from the boot task storage medium 120 and is subsequently executed to enable the overlapping of driver fetch routines and driver execution routines. More specifically, the multi-processor initiation driver 208 may enable the second processor 116 to fetch at least one driver stored in the boot task storage medium 120 while the first processor 114 executes a previously fetched driver.

In at least some embodiments, execution of the multi-processor initiation driver 208 configures the first processor 114 to perform execution routines and configures the second processor 116 to perform fetch routines. Alternatively, the first processor 114 performs fetch and execution routines and the second processor 116 performs fetch routines. In either case, at least some of the fetch routines performed by the second processor 116 overlap with some of the execution routines performed by the first processor 114. Thus, some synchronization occurs between the fetch routines of the second processor 116 and the execution routines of the first processor 114 in order to reduce the total boot-up time.

As an example, during a boot process, a predetermined driver is fetched from the boot task storage medium 120 and is stored in the system memory 130. Either the first processor 114 or the second processor 116 fetches the predetermined driver. While the second processor 116 fetches a subsequent driver from the boot task storage medium 120, the first processor 114 executes the predetermined driver stored in the system memory 130.

In accordance with at least some embodiments, the first processor 114 and the second processor 116 are able to communicate with each other to ensure proper synchronization of fetch routines performed by the second processor 116 and execution routines performed by the first processor 114. Communications between the first processor 114 and the second processor 116 may be based on a shared table or another data structure, interrupts, or inter-processor communication. As a specific example, once the second processor 116 has fetched a driver (i.e., transferred the driver from the boot task storage medium 120 to the system memory 130), the second processor 116 notifies the first processor 114 that the fetched driver (or set of drivers) is ready to be executed. The first processor 114 then executes the corresponding fetched driver (or set of drivers) and waits for a subsequent prompt from the second processor 116 to execute the next fetched driver (or set of drivers). In alternative embodiments, the first processor 114 periodically queries the second processor 116 or checks the status of a shared table to determine when drivers have been fetched and are ready to be executed.

In situations where the both first processor 114 and the second processor 116 are configured to perform fetch routines, the first processor 114 may be given priority over the second processor 116. In such a case, the fetch routines of second processor 116 are subject to interruption by the fetch routines of the first processor 114. However, the fetch routines of the first processor 114 cannot be interrupted by the fetch routines of the second processor 116.

As shown in the embodiment of FIG. 1, the boot task storage medium 120 stores first type drivers 122 and second type drivers 124. For example, the first type drivers 122 may correspond to first phase drivers and the second type drivers 124 may correspond to second phase drivers (i.e., the first phase drivers are executed before the second phase drivers). As a specific example, in embodiments that implement an EFI BIOS memory as the boot task storage medium 120, the first type drivers 122 represent pre-EFI initiation (PEI) phase drivers and the second type driver 124 represent driver execution environment (DXE) phase drivers. Alternatively, the first type drivers 122 and the second type drivers 124 represent other phases of an EFI-based boot process or other boot process. Alternatively, the first type drivers 122 represent a first set of drivers without dependencies and the second type drivers 124 represent a second set of drivers with dependencies, where the first set of drivers are executed before the second set of drivers.

In accordance with at least some embodiments, the first processor 114 is assigned to execute first type drivers 122 and second type drivers 124 that have been fetched from the boot task storage medium 120 and stored in the system memory 130. Meanwhile, the second processor 116 is assigned to fetch at least second type drivers 124 from the boot task storage medium 120. As previously mentioned, the first type drivers 122 may represent PEI phase drivers and the second type driver 124 may represent DXE phase drivers. However, it should be understood that overlapping fetch routines of the second processor 116 with execution routines of the first processor 114 could involve different driver types or even a single driver type. Further, the multi-processor initiation driver 208 may assign either the first processor 114 or the second processor 116 to fetch the first type drivers 122.

As shown in FIG. 1, the electronic device 102 optionally comprises at least one output device 140 (e.g., liquid crystal display (LCD), printer, video monitor, touch screen display, a light-emitting diode (LED), etc.) and/or at least one input device 150 (e.g., keyboard, touchpad, buttons, keypad, switches, dials, mouse, track-ball, voice recognizer, card reader, etc.)—each of which are communicatively coupled to the processors 112. In accordance with some embodiments, drivers executed during the boot process support certain output devices 140 and/or input devices 150, which are utilized during runtime of the electronic device 102. It should be understood that the output devices 140 may vary or be absent depending on the type of electronic device 102 and its configuration. Likewise, the input devices 140 may vary or be absent depending on the type of electronic device 102 and its configuration.

In response to a cold boot or system reset, the instruction pointer of one of the processors 112 is directed to the first instruction in a set of boot instructions (e.g., drivers stored in the boot task storage medium 120). Execution of boot instructions begins at a predetermined reset code portion and proceeds sequentially until all of the instructions needed to initialize the electronic device 102 have been executed. Initialization includes loading the main OS and/or other known boot operations.

Under the EFI 2.0 architecture, this initialization process includes various execution phases of firmware drivers. Some examples of EFI execution phases include a Security (SEC) phase, a Pre-EFI Initialization (PEI) phase, and a Driver Execution Environment (DXE) phase. In the SEC phase, various functions are performed such as setting the host system to a predetermined bit mode (e.g., a 32 bit mode), determining available system resources, authenticating boot code, and/or providing information to the host system. The PEI phase is responsible for main memory initialization and setting up enough of the platform fabric and resources to hand-off control to the DXE phase. For example, instructions executed in the PEI phase support an Instruction Set Architecture (ISA) framework and PEI Module (PEIM) execution. The firmware code in the PEIMs may be used to abstract the particular platform, chipset, and policy abstractions for the electronic device 102. During the DXE phase, an ISA-specific framework is executed to load DXE drivers, which support input/output (I/O) services such as block device abstractions, consoles, and an EFI file system. Also, at least one DXE driver provides a Boot-Device Selection (BDS) function, which controls the OS load and console selection policy.

Figure 2:
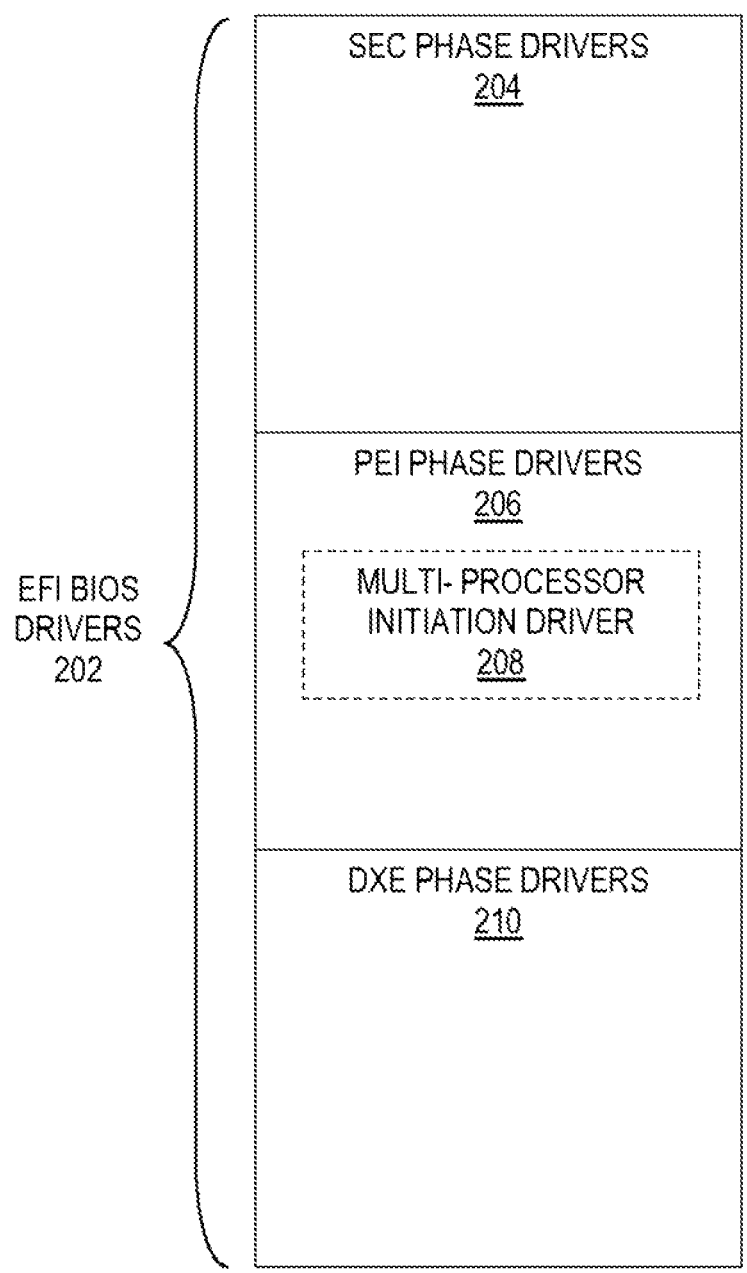
FIG. 2 shows drivers of an Extensible Firmware Interface (EFI) Basic Input/Output System (BIOS) in accordance with an embodiment of the disclosure.

FIG. 2 shows drivers 202 of an EFI BIOS in accordance with an embodiment of the disclosure. The drivers 202 comprise, for example, SEC phase drivers 204, PEI phase drivers 206, and DXE phase drivers 210. Upon execution by one of the processors 112, the drivers 202 perform the functions described previously and/or other boot operations. In the embodiment of FIG. 2, the multi-processor initiation driver 208 described for FIG. 1 is one of the PEI phase drivers 206. Alternatively, the multi-processor initiation driver 208 may be one of the DXE phase drivers. In either case, upon execution of the multi-processor initiation driver 208, at least one driver fetch routine performed by a processor (e.g., the second processor 116) overlaps with a driver execution routine performed by another processor (e.g., the first processor 114).

Figure 3:
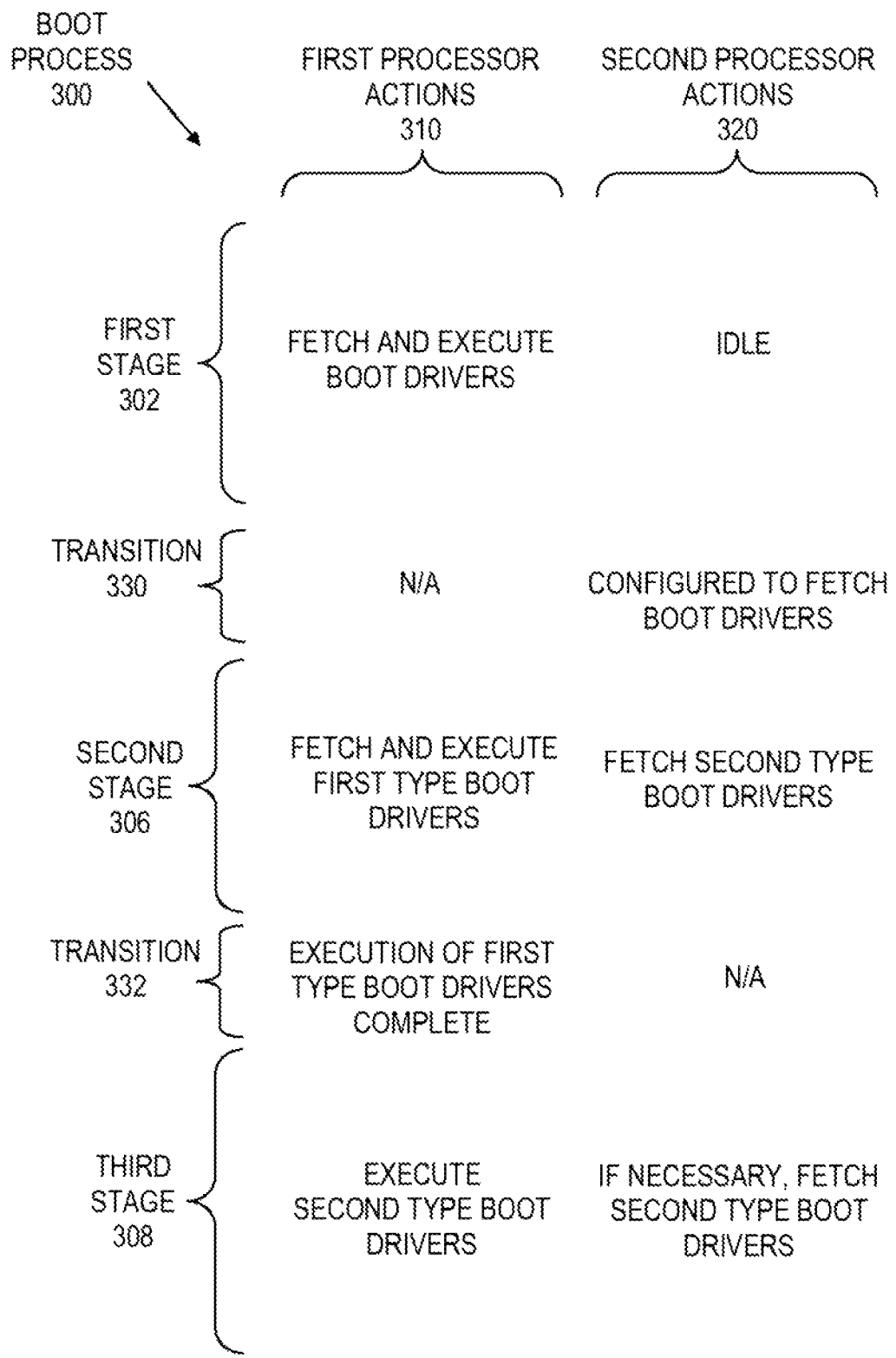
FIG. 3 shows a staged boot process in accordance with an embodiment of the disclosure.

FIG. 3 shows a staged boot process 300 in accordance with an embodiment of the disclosure. In FIG. 3, various stages separated by transitions are illustrated. More specifically, a first stage 302 and a second stage 306 are separated by a transition 330. Also, the second stage 306 is separated from a third stage 308 by a transition 332. In other words, each transition triggers a subsequent stage. In FIG. 3, first processor actions 310 (e.g., actions of the first processor 114) and second processor actions 320 (e.g., actions of the second processor 116) are shown for each of the stages 302, 306, 308 and transitions 330, 332.

In the first stage 302, a first processor fetches and executes boot drivers. Meanwhile, a second processor is idle (i.e., during the first stage, the first processor fetches and executes boot drivers without assistance from the second processor). During the transition 330, the second processor is configured to fetch boot drivers. In the second stage 306, the first processor fetches and executes first type boot drivers. Meanwhile, the second processor fetches second type boot drivers. Preferably, the second stage operations of the first and second processors are overlapped. During the transition 332, the first processor completes execution of the first type boot drivers. In the third stage 308, the first processor executes second type boot drivers. Meanwhile, if there are still second type boot drivers to fetch, the second processor fetches second type boot drivers. Preferably, the third stage operations of the first and second processors are overlapped. In accordance with at least some embodiments, the first type boot drivers correspond to PEI phase drivers and the second type boot drivers correspond to DXE phase drivers. Alternatively, the first and second type boot drivers may correspond to other phases of a boot process (not just PEI and DXE phases). Alternatively, the first type boot drivers may correspond to drivers without dependencies and the second type boot drivers may correspond to drivers with dependencies.

Figure 4:
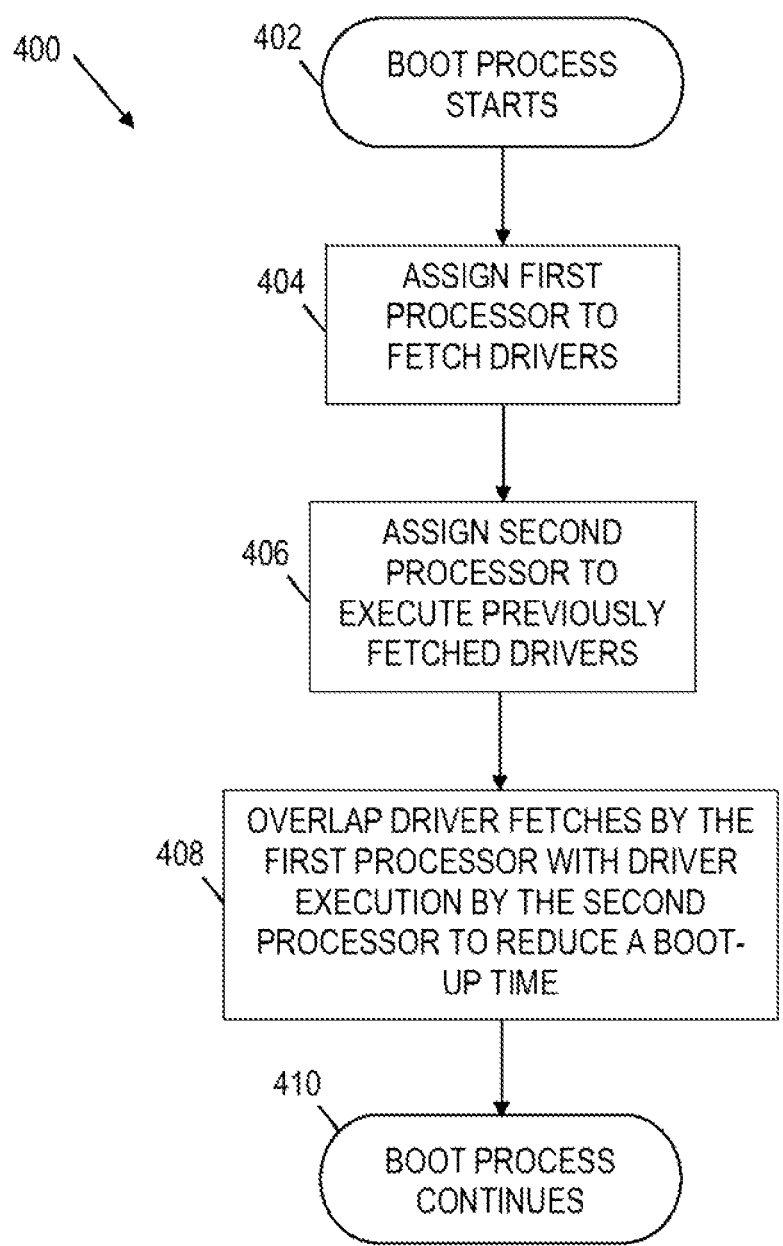
FIG. 4 shows a method in accordance with an embodiment of the disclosure.

FIG. 4 shows a method 400 in accordance with an embodiment of the disclosure. In the method 400, a boot process starts (block 402) and a first processor is assigned to fetch drivers (block 404). At block 406, a second processor is assigned to execute previously fetched drivers. In the method 400, driver fetches by the first processor are overlapped with driver execution by the second processor to reduce a boot-up time (block 408) and the boot process continues (block 410).

In at least some embodiments, the method 400 may comprise fewer steps or additional steps. For example, in some embodiments, the method 400 may additionally comprise executing a multi-processor initiation driver stored in a BIOS memory, where said execution initiates the assigning steps (blocks 404 and 406) and the overlapping step (block 408). The multi-processor initiation driver may be executed, for example, during a PEI phase of an EFI boot process. In at least some embodiments, the overlapping step (block 408) comprises overlapping fetches of DXE phase drivers with execution of DXE phase drivers. Additionally or alternatively, the overlapping step (block 408) comprises overlapping fetches of DXE phase drivers with execution of PEI phase drivers.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a first processor;
 a second processor configured to fetch but not to execute boot driver routines; and
 a boot task storage medium that can only be accessed by one of the first and second processors at a time, wherein a boot process of the system has a first stage and a second stage,
 during the first stage, the first processor fetches and executes the boot driver routines without assistance from the second processor,
 during the second stage, boot driver routine execution performed by the first processor overlaps with at least one boot driver routine fetch performed by the second processor, wherein the overlap is enabled by execution of a multi-processor initiation driver stored by the boot task storage medium and executed by the first processor.

2. The system of claim 1 wherein the first stage transitions to the second stage upon execution of the mufti-processor initiation driver stored by the boot task storage medium and executed by the first processor.

3. The system of claim 1 wherein boot task storage medium is an Extensible Firmware Interface (EFI) Basic Input/Output System (BIOS) memory.

4. The system of claim 1 wherein, during the second stage, the second processor fetches at least one driver execution environment (DXE) phase driver while the first processor executes a previously fetched DXE phase driver.

5. The system of claim 1 wherein, during the second stage, the first processor executes at least one first type boot driver while the second processor fetches at least one second type boot driver.

6. The system of claim 5 wherein the at least one first-type boot driver comprises a pre-EFI (PEI) phase driver and the second-type boot driver comprises a driver execution environment (DXE) phase driver.

7. The system of claim 5 wherein first-type boot driver comprises a driver without dependencies and the second-type boot driver comprises a driver with dependencies.

8. The system of claim 1 wherein, during the second state, the first processor is configured to fetch and execute boot tasks, wherein the first processor has priority over the second processor to fetch boot tasks.

9. The system of claim 1, wherein the first processor communicates with the second processor to synchronize the boot task execution performed by the first processor and the boot task fetch performed by the second processor.

10. The system of claim 1 wherein the second processor fetches multiple boot driver routines during at least one fetch cycle upon accessing the boot task storage medium.

11. A non-transitory computer-readable medium storing instructions that, when executed, cause a processor to:

configure a first processor to fetch boot tasks but not to execute boot tasks;

configure a second processor to execute boot tasks; and synchronize boot task fetches performed by the first processor with boot task execution performed by the second processor by overlapping at least one boot driver fetch performed by the first processor with boot task execution performed by the second processor, thereby to reduce a boot-up time.

12. A boot-up method, comprising:

assigning a first processor to fetch drivers but not to execute drivers;

assigning a second processor to execute previously fetched drivers;

overlapping at least one driver fetch by the first processor with driver execution by the second processor to reduce a boot-up time; and executing a mufti-processor initiation driver stored in a Basic Input/Output System (BIOS) memory, wherein said execution initiates said assigning and overlapping steps.

13. The boot-up method of claim 12 wherein the mufti-processor initiation driver is executed during a pre-EFI (PEI) phase.

14. The boot-up method of claim 12 wherein said overlapping comprises overlapping fetches of driver execution environment (DXE) phase drivers and execution of DXE phase drivers.

15. The boot-up method of claim 12 wherein said overlapping comprises overlapping fetches of driver execution environment (DXE) phase drivers and execution of pre-EFI (PEI) phase drivers.

* * * * *

UNITED STATES PATENT AND TRADEMARK OFFICE
CERTIFICATE OF CORRECTION

PATENT NO. : 9,274,804 B2  
APPLICATION NO. : 13/145734  
DATED : March 1, 2016  
INVENTOR(S) : Kurt D. Gillespie et al.

Page 1 of 1

It is certified that error appears in the above-identified patent and that said Letters Patent is hereby corrected as shown below:

In the claims,

In column 6, line 34, in Claim 2, delete "mufti" and insert -- multi --, therefor.

In column 7, line 18, in Claim 12, delete "mufti" and insert -- multi --, therefor.

In column 7, line 22, in Claim 13, delete "mufti" and insert -- multi --, therefor.

Signed and Sealed this  
Twelfth Day of July, 2016

Michelle K. Lee  
*Director of the United States Patent and Trademark Office*